(12) United States Patent
Brewer et al.

(10) Patent No.: US 10,584,804 B2
(45) Date of Patent: Mar. 10, 2020

(54) HYDRAULIC VALVE

(71) Applicant: Claverham Limited, Shirley, Solihull (GB)

(72) Inventors: Paul Brewer, Bristol (GB); Reg Raval, Bristol (GB); Suat Bekircan, Bath (GB)

(73) Assignee: CLAVERHAM LIMITED, Avon (GB)

( * ) Notice: Subject to any disclaimer, the term of this patent is extended or adjusted under 35 U.S.C. 154(b) by 0 days.

(21) Appl. No.: 15/964,123

(22) Filed: Apr. 27, 2018

(65) Prior Publication Data

US 2018/0340628 A1    Nov. 29, 2018

(30) Foreign Application Priority Data

May 25, 2017    (EP) .................................... 17275076

(51) Int. Cl.
  *F16K 31/46*    (2006.01)
  *F16K 31/52*    (2006.01)
  *F16K 31/60*    (2006.01)
  *F16K 11/07*    (2006.01)
  *G05G 23/00*    (2006.01)

(52) U.S. Cl.
  CPC .......... *F16K 31/46* (2013.01); *F16K 11/0716* (2013.01); *F16K 31/523* (2013.01); *F16K 31/602* (2013.01); *G05G 23/00* (2013.01)

(58) Field of Classification Search
  CPC ........ F16K 31/46; F16K 31/523; F16K 11/14; F16K 31/0613; F16K 31/0603; F15B 13/00; F15B 13/0402; Y10T 137/8671; Y10T 137/86622; Y10T 137/86694

USPC ............ 251/279, 129.11, 129.2; 137/625.69, 137/625.65, 625.26, 625.67
  See application file for complete search history.

(56) References Cited

U.S. PATENT DOCUMENTS

| 2,941,515 | A |   | 6/1960  | Garnjost |           |
|-----------|---|---|---------|----------|-----------|
| 3,822,634 | A |   | 7/1974  | Faisandier |         |
| 4,128,047 | A | * | 12/1978 | Caero    | B64C 13/44 |
|           |   |   |         |          | 137/624.27 |
| 4,530,487 | A |   | 7/1985  | Tew et al. |         |

(Continued)

FOREIGN PATENT DOCUMENTS

| EP | 0251807 A2 | 1/1988 |
| EP | 3128216 A1 | 2/2017 |

(Continued)

OTHER PUBLICATIONS

Extended European Search Report for International Application No. 17275076.2 dated Nov. 9, 2017, 9 pages.

(Continued)

*Primary Examiner* — Kevin F Murphy
*Assistant Examiner* — Kelsey E Cary
(74) *Attorney, Agent, or Firm* — Cantor Colburn LLP

(57) ABSTRACT

A drive lever comprising a first end for insertion into a slot of the hydraulic spool valve. The first end comprises at least two resilient members which resist radial compression ($R_1$, $R_2$) such that they exert a radially outward force ($F_1$, $F_2$) on one or more inner surfaces of the slot when inserted therein. This radially outward force ($F_1$, $F_2$) can account for any backlash that would otherwise be present between the drive lever and the slot due to manufacturing tolerances or wear.

12 Claims, 4 Drawing Sheets

(56) References Cited

U.S. PATENT DOCUMENTS

| | | | |
|---|---|---|---|
| 5,040,568 A * | 8/1991 | Hair | F15B 13/0402 |
| | | | 137/625.65 |
| 5,671,651 A * | 9/1997 | Pfaff | B64C 13/42 |
| | | | 91/523 |
| 5,758,546 A * | 6/1998 | Taomo | F02B 63/02 |
| | | | 74/488 |
| 5,868,166 A | 2/1999 | Miller | |
| 6,470,912 B1 | 10/2002 | Haynes | |
| 7,828,245 B2 | 11/2010 | Suisse et al. | |
| 8,210,206 B2 | 7/2012 | Coakley | |
| 9,309,900 B2 | 4/2016 | Kopp | |
| 2005/0000579 A1 * | 1/2005 | Burrola | F16K 11/048 |
| | | | 137/625.65 |
| 2017/0037877 A1 | 2/2017 | Brewer et al. | |

FOREIGN PATENT DOCUMENTS

| | | |
|---|---|---|
| FR | 2887949 A1 | 1/2007 |
| GB | 1366625 A | 9/1974 |
| JP | H06185614 A | 7/1994 |
| KR | 101409765 B1 | 6/2014 |

OTHER PUBLICATIONS

Communication pursuant to Article 94(3) for Application No. 17275076.2, dated Jul. 10, 2019 5 pages.

\* cited by examiner

HYDRAULIC VALVE

FOREIGN PRIORITY

This application claims priority to European Patent Application No. 17275076.2 filed May 25, 2017, the entire contents of which is incorporated herein by reference.

TECHNICAL FIELD

This disclosure relates to a drive lever for actuating a hydraulic spool valve (also referred to as a hydraulic servo valve), and a hydraulic spool valve assembly featuring the same. This disclosure also relates to a method of connecting a drive lever to a hydraulic spool valve. Such hydraulic spool valves are often used in duplex hydraulic systems for redundancy in aerospace applications.

BACKGROUND

Duplex hydraulic systems are used for example in aircraft actuator systems for redundancy and safety so that if one system fails, the other remains operational, allowing continued control of the relevant system. For example the main rotor actuator in a helicopter typically uses a duplex hydraulic control system. Failure modes may include seal failures (leaks), pipe bursts, component structural failure or pump failure. Triplex and even quadruplex systems are also used in some applications.

Hydraulic spool valves in flight control actuators are usually driven by a mechanical lever connected to the pilots input lever which is in turn connected to the pilot's controls by a mechanical linkage. Where duplex hydraulic systems are employed for redundancy and safety reasons, two valves are used, one for each system, driven by a single layshaft and lever assembly. Synchronization of these two valves is critical to avoid potentially damaging 'force fight' between the two hydraulic systems. Force fight is created by the two valves being out of synchronization and this can lead to pressure intensification within the actuator. This intensification can cause premature seal failures and may also cause fatigue damage within the actuator. Any backlash or clearances due to manufacturing tolerances between the drive levers and the spools is exploited and can lead to unequal base pressures which in turn can cause unsatisfactory performance. Force fight can occur in actuators with tandem cylinder configurations, as shown in FIG. 4. The four chamber pressures within the cylinder need to be precisely controlled so as to minimise the internal forces generated within the tandem piston and cylinder arrangement. These chamber pressures (referred to as base pressures) are controlled by very small spool displacements (around 0.001 inch or 25.4 µm) and therefore any small amount of deviation in the valve synchronization between the two hydraulic systems can result in damaging force fights.

It is therefore necessary to manufacture to extremely tight tolerances to ensure zero or minimum clearances. However, manufacturing to such tight tolerances provides more expensive components and as the components wear during use the tight tolerance may be lost.

A prior art system that addresses these issues is disclosed in EP 3 128 216. The system uses a hydraulically controlled pressure plate to account for backlash between the drive lever and the slot in the hydraulic spool valve.

SUMMARY

From a first aspect, the present disclosure relates to a drive lever in accordance with claim 1.

The radially outward forces between the resilient members and the slot inner surface(s) prevents any gap therebetween and thus reduces or prevents any backlash between the drive lever and the hydraulic spool valve.

The resilient members are sized and configured such that the radially outward forces are greater than the force(s) needed to move the hydraulic spool valve. In this manner, the resilient members maintain a contact force on the inner surface(s) of the slot, and prevent backlash, even when the hydraulic spool valve is being actuated. In addition, the radially outward force is sufficient to allow the resilient members to maintain this contact force on the inner surface(s) of the slot, even after wear of the resilient members and/or the inner surface(s).

In one embodiment of the above, there are two or more inner surfaces of the slot, and each resilient member exerts a radially outward force on a respective inner surface.

In one embodiment of the above drive lever, the at least two resilient members are spaced radially apart.

In a further embodiment of the above drive levers, the at least two resilient members are integrally formed and separated by a slot. The slot may be a key-hole slot (so-called because it features a straight portion and circular portion, which creates an outline similar to that of a key-hole).

In an alternative embodiment to the above drive lever, the at least two resilient members are separately formed and arranged to form a cantilever. The cantilever may be formed by a fastener being secured through the at least two resilient members and an intervening portion of the drive lever, and the fastener may be a rivet.

In a further embodiment of any of the above drive levers, the first end comprises a case hardened surface.

In a further embodiment of any of the above drive levers, the at least two resilient members have a cambered outer surface.

From a second aspect, the present disclosure relates to a hydraulic spool valve assembly in accordance with claim 10.

In one embodiment of the above hydraulic spool valve assembly, a portion of one or more of the inner surfaces of the slot is chamfered.

In a further embodiment of any of the above hydraulic spool valve assemblies, the drive lever is operatively connected to the hydraulic spool valve such that movement of the drive lever causes the hydraulic spool valve to move axially.

In an alternative embodiment to that of the above hydraulic spool valve assembly, the hydraulic spool valve assembly comprises two or more hydraulic spool valves operatively connected to the drive lever such that movement of the drive lever causes the two or more hydraulic spool valves to move axially.

In a further embodiment of any of the above hydraulic spool valve assemblies, the drive lever has the features of any of the drive levers described under the first aspect of this disclosure.

From a third aspect, the present disclosure relates to a hydraulic actuator in accordance with claim 14.

From a fourth aspect, the present disclosure relates to a method of connecting a drive lever to a hydraulic spool valve in accordance with claim 15.

BRIEF DESCRIPTION OF DRAWINGS

One or more non-limiting examples will now be described, by way of example only, and with reference to the accompanying figures in which:

FIG. 2b illustrates a magnified view of the first end of the drive lever of FIG. 2a;

FIG. 3b illustrates a magnified view of the first end of the drive lever of FIG. 3a.

DETAILED DESCRIPTION

Figure 1:
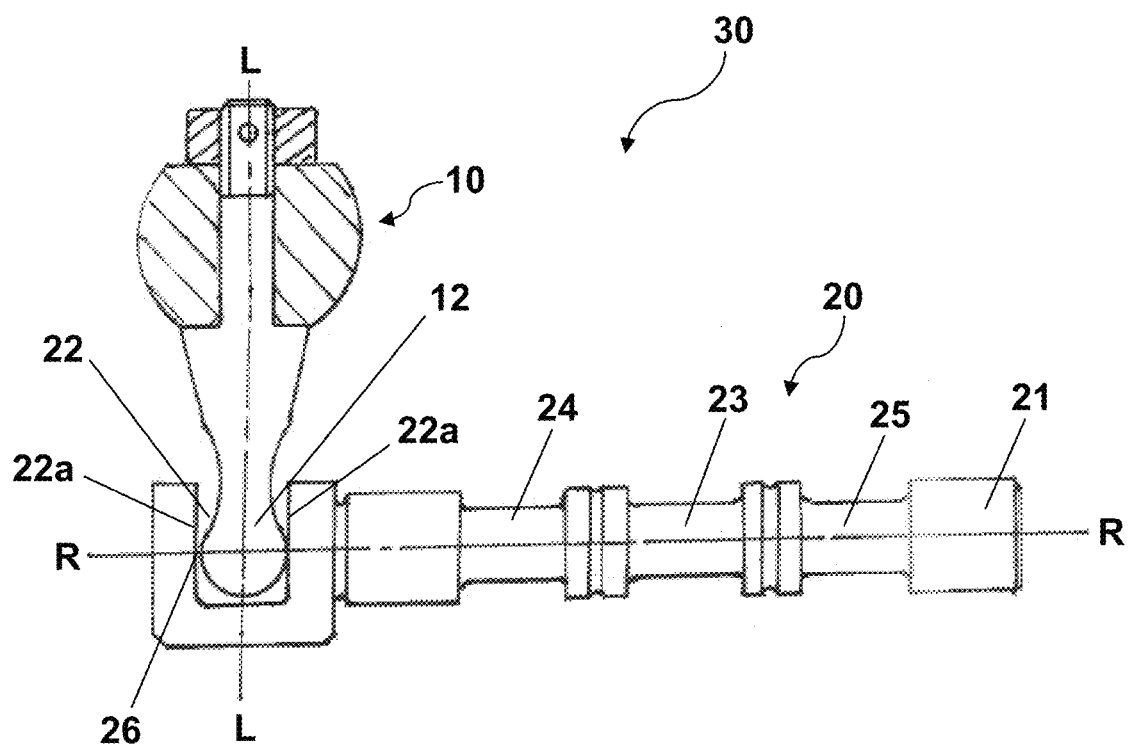
FIG. 1 illustrates a conventional drive lever and the problem of backlash in a hydraulic spool valve.
Figure 4:
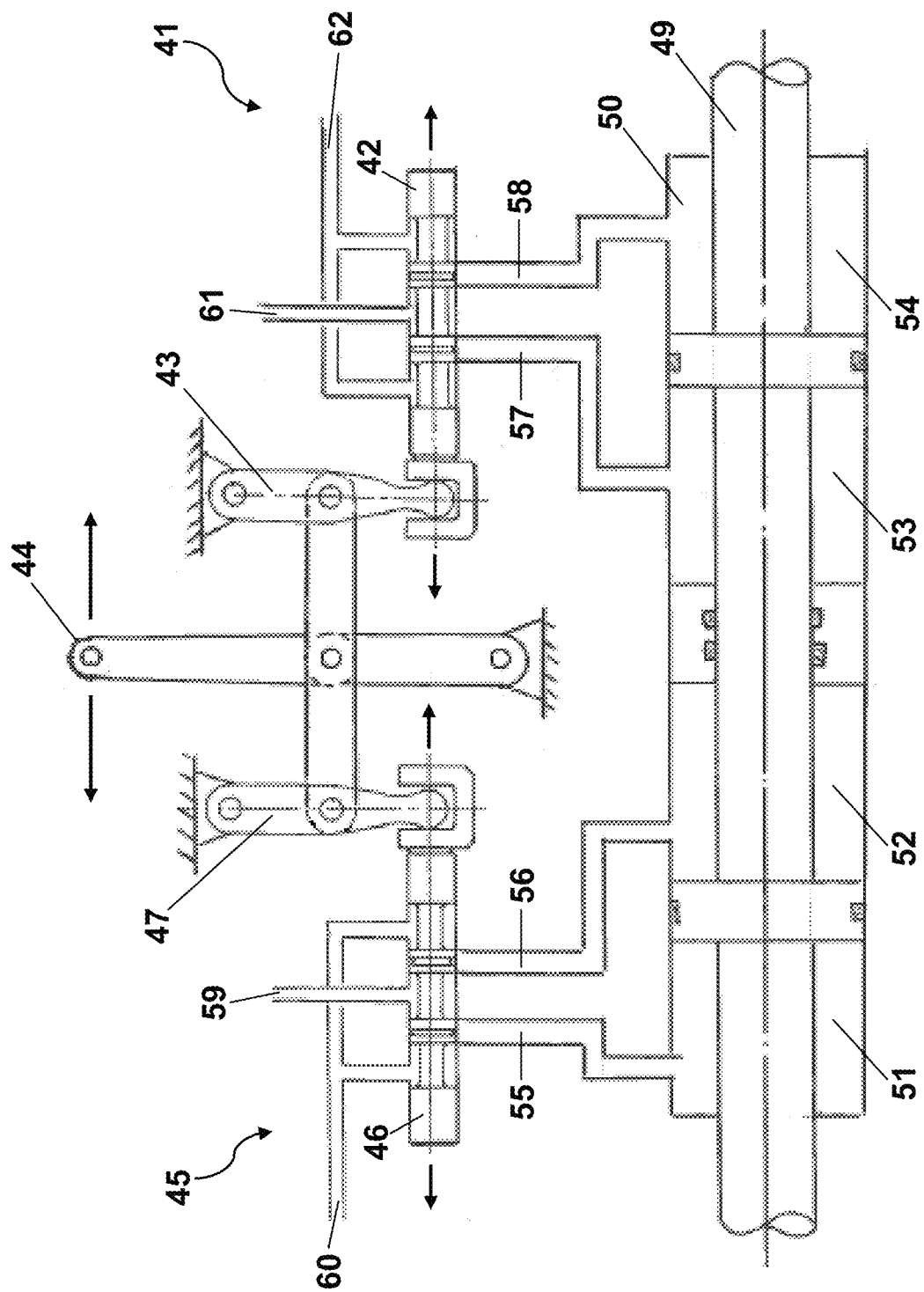
FIG. 4 schematically shows a duplex hydraulic actuator.

FIG. 1 shows a conventional hydraulic spool valve assembly 30 comprising hydraulic spool valve 20 and drive lever 10 having a longitudinal axis L. The spool valve assembly may form part of a duplex hydraulic actuator as illustrated in FIG. 4. Backlash between a first end 12 of the drive lever 10 and an inner surface 22a of the slot 22 of the hydraulic spool valve 20, in which the first end 12 of drive lever 10 sits, is indicated by reference numeral 26. This backlash 26 arises due to manufacturing tolerances or wear of the components over time. The backlash 26 is simply a gap between the first end 12 and the internal width of the slot 22 in which it sits. The backlash 26 results in the drive lever 10 having an amount of play within the slot 22, i.e. the drive lever 10 can move back and forth a small distance without causing a corresponding movement of the hydraulic spool valve 20. This backlash 26 can lead to hysteresis in performance and undesirable force fight in the case of multiple hydraulic systems (e.g. duplex, triplex etc.). This effect can be minimized by the use of tight tolerances and selective assembly but this is an expensive and time consuming process. Moreover, the backlash that arises due to wear over time can only be corrected by replacing parts so as to achieve a better fit again.

The hydraulic spool valve 20 has a shaft 21 that extends axially and, in use, is moved axially back and forth so as to alter the fluid connections of the valve of which it is a part. The shaft 21 is an elongate cylinder (typically of generally circular cross-section, although this is not essential) with various chambers formed along its length. The hydraulic spool valve 20 includes a pressure chamber 23 in the middle, located between a first return chamber 24 and a second return chamber 25. Depending on the axial position of the hydraulic spool valve 20, the pressure chamber 23 will connect a high pressure inlet to a selected high pressure outlet. In a typical arrangement, a hydraulic spool valve may be used to direct the high pressure fluid from the inlet to a selected side of a piston within a (downstream) hydraulic cylinder in order to cause movement of the piston within the hydraulic cylinder. At the same time, the axial position of the hydraulic spool valve determines which of the first and second return chambers 24, 25 is connected to a corresponding return line. In a typical arrangement of a hydraulic spool valve, the return line and return chambers 24, 25 allow fluid from the non-pressurised side of the hydraulic cylinder to drain back to a reservoir as the piston moves.

Figure 2A:
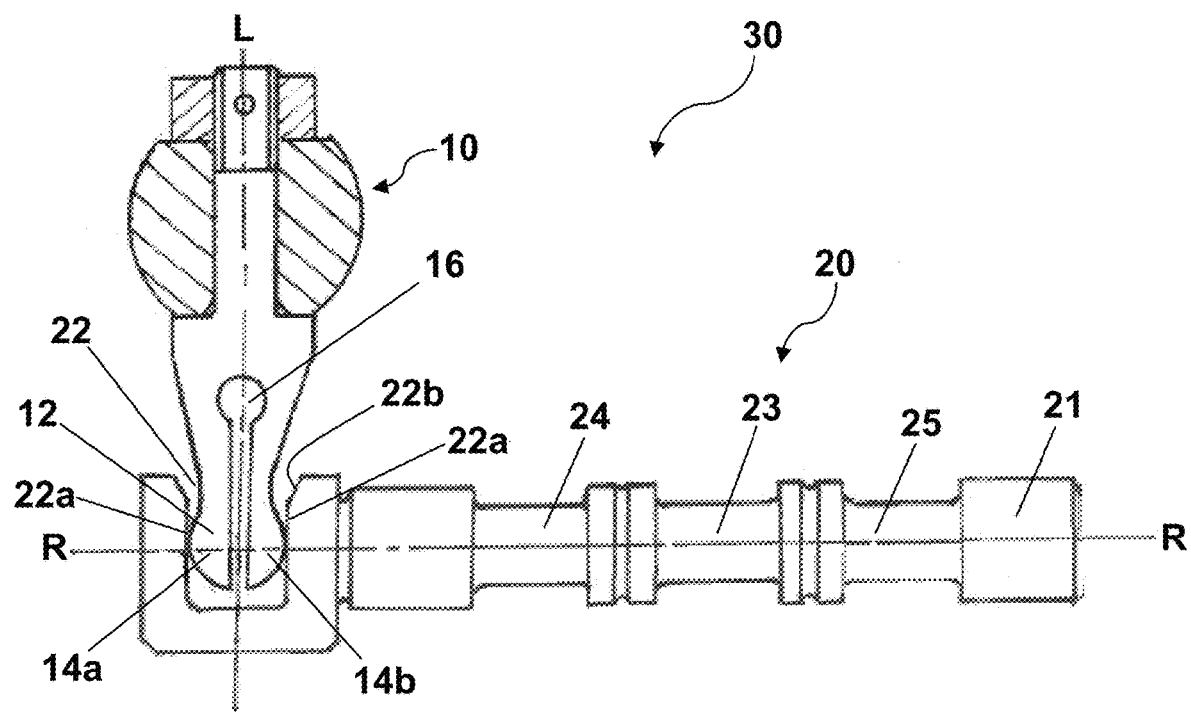
FIG. 2a illustrates a first example of a drive lever in accordance this disclosure.
Figure 3A:
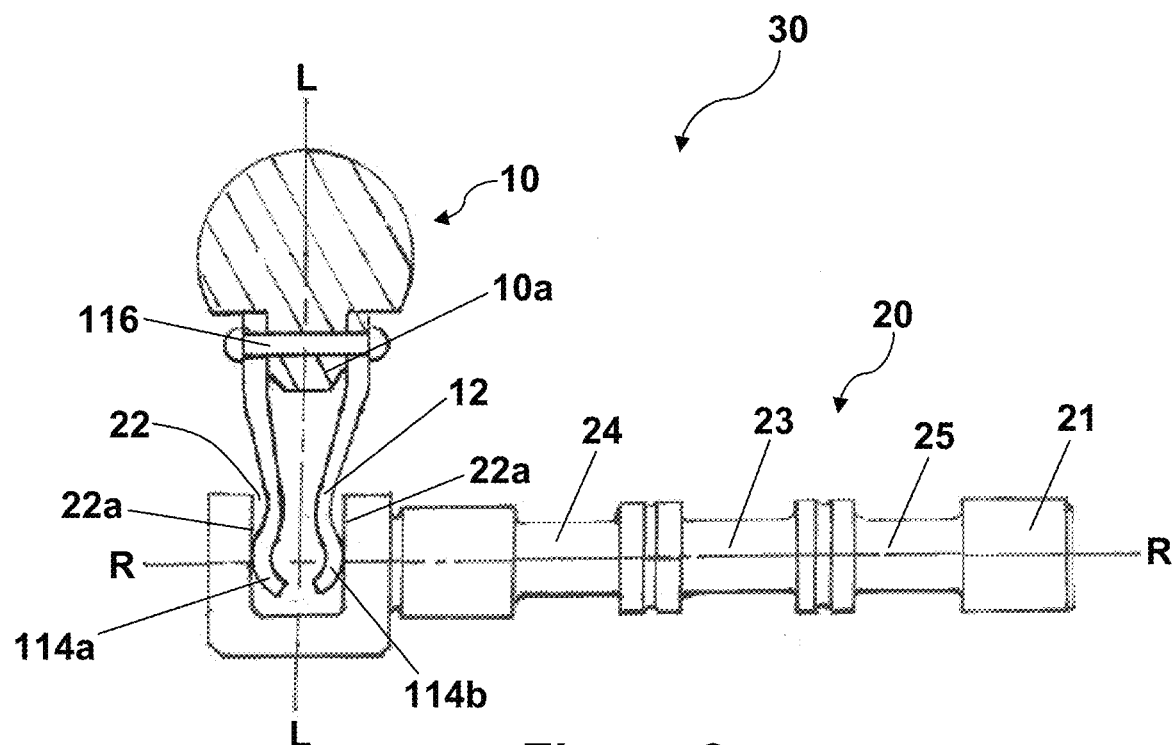
FIG. 3a illustrates a second example of a drive lever in accordance with this disclosure.

In accordance with this disclosure, FIGS. 2a and 3a show two examples of hydraulic spool valve assemblies 30 having drive lever 10 connections to a hydraulic spool valve 20 which aim to reduce the backlash 26 between the first end 12 of the drive lever 10 and the slot 22.

Figure 2B:
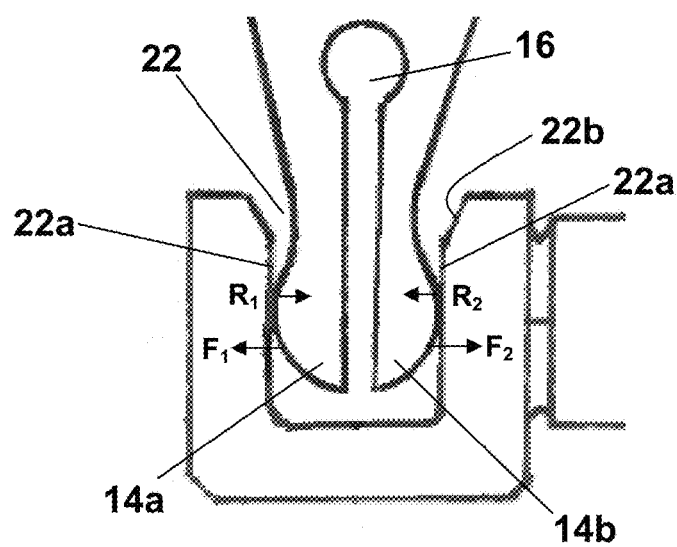

As shown in FIGS. 2a and 2b, first end 12 comprises two resilient members 14a, 14b that oppose each other and are spaced radially apart (i.e. along axis R, which is perpendicular to longitudinal axis L of the drive lever 10). Resilient members 14a, 14b are integrally formed together and are separated by a key-hole slot 16. A key-hole slot 16 is so-called because it features a straight portion and circular portion (as shown), which creates an outline similar to that of a key-hole. Resilient members 14a, 14b are so-called because they are resistant to compression in a radially inward direction ($R_1$, $R_2$)(i.e. along axis R).

When disconnected from the hydraulic spool valve 20 (i.e. when not inserted into slot 22), the distance between the opposed outer surfaces of resilient members 14a, 14b (i.e. the outer diameter of the first end 12) is set to be slightly larger than the width of slot 22. In this manner, the resilient members 14a, 14b are compressed radially inward when engaged with inner surfaces 22a of the slot 22. Due to the aforementioned resilience, the resilient members 14a, 14b will thus each apply a radially outward force ($F_1$, $F_2$) against the inner surfaces 22a of the slot 22 in response to the compression (i.e. along axis R, in opposite directions $R_1$ and $R_2$). This radially outward force accounts for any backlash that could be present between the slot 22 and drive lever 10 due to manufacturing tolerances or subsequent wear of the resilient member 14a, 14b and/or the inner surfaces 22a of the slot 22 during use. The radially outward force is also great enough such that contact between each resilient member 14a, 14b and the inner surfaces 22a of the slot 22 is maintained during movement of drive lever 10.

Resilient members 14a, 14b feature a cambered (i.e. curved or rounded) outer surface and the inner surfaces 22a of slot 22 feature a chamfered portion 22b, which co-operate to aid insertion of the drive lever 10 into slot 22. When inserted into the slot 22, the cambered surface of the resilient members 14a, 14b will cam against the chamfered portion 22b and be pushed together in the radial direction (i.e. compressed together). This prevents the need for a separate "squeezing" operation (i.e. pushing the resilient members together) to insert the resilient member 14a, 14b into slot 22.

Figure 3B:
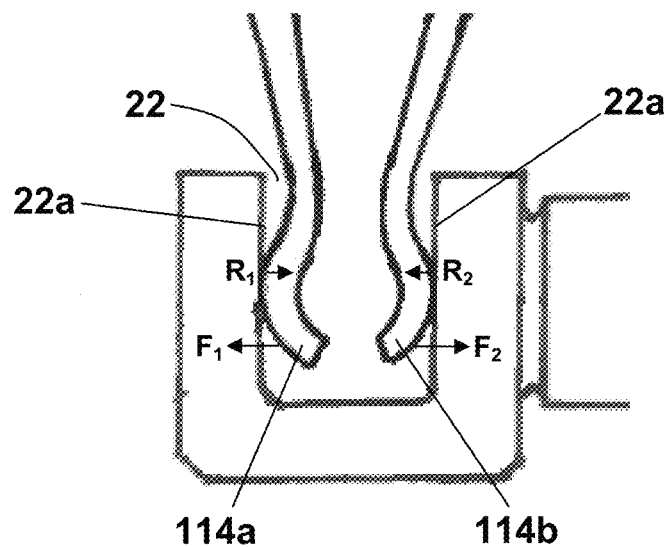

FIGS. 3a and 3b show resilient members 114a, 114b, which have the same attributes and operate in the same manner as resilient members 14a, 14b. However, unlike resilient members 14a, 14b, resilient members 114a, 114b are not integrally formed, but rather are two separate members that are fastened to an intervening portion (10a) of the drive lever 10 using a rivet 116. In this manner, resilient members 114a, 114b form cantilevers, which resist compression in a radially inward direction ($R_1$ and $R_2$).

Such an arrangement of resilient members may be "less stiff" than those of FIGS. 2a and 2b, meaning resilient members 114a, 114b can be pushed together (i.e. compressed radially inwardly) with less force than resilient members 14a, 14b. This may facilitate insertion of drive lever 10 into slot 22, but may also decrease transmission stiffness. To this end, it will be noted that FIGS. 3a and 3b do not show a chamfered portion 22b of slot 22, as the reduced compression force means it may not be necessary to aid insertion as with FIGS. 2a and 2b. However, it is to be understood that the examples of FIGS. 3a and 3b can include a chamfered portion 22b within the scope of this disclosure.

Referring to both the examples of FIGS. 2a and 3a, in order to facilitate wear resistance and improve durability of the connection between the drive lever 10 and hydraulic spool valve 20, the outer surface of the first end 12 (and resilient members 14a, 14b, 114a, 114b) may be case hardened by any suitable method known in the art. Alternatively or in addition, a friction reducing coating can also be applied to the outer surface of the first end 12 (and resilient members 14a, 14b, 114a, 114b).

FIG. 4 schematically shows a duplex hydraulic actuator system with a first hydraulic system 41 and a second hydraulic system 45. First hydraulic system 45 has a first hydraulic spool valve 42 which is actuated via first drive lever 43 by common input lever 44. Second hydraulic system 45 has a second hydraulic spool valve 46 which is actuated via second drive lever 47 by common input lever 44.

The first and second drive levers 43, 45 may be as described above and/or as shown in FIG. 2a or 3a.

Hydraulic cylinder 50 houses piston 49. Four fluid chambers are formed between the piston 49 and the cylinder 50, namely first fluid chamber 51, second fluid chamber 52, third fluid chamber 53 and fourth fluid chamber 54.

When (the upper end of) common input lever 44 is moved to the right (in the figure), the two hydraulic spool valve 42, 46 are moved to the right. First hydraulic spool valve 42 thus connects pressure line 61 to line 58, causing hydraulic fluid to flow into fourth chamber 54. At the same time, line 57 is connected to return line 62 allowing hydraulic fluid to flow out of third chamber 53. Simultaneously, second hydraulic spool valve 46 connects pressure line 59 to line 56, causing hydraulic fluid to flow into second chamber 52. At the same time, line 55 is connected to return line 60 allowing hydraulic fluid to flow out of first chamber 51. Piston 49 is therefore caused to move to the left.

When (the upper end of) common input lever 44 is moved to the left (in the figure), the two hydraulic spool valves 42, 46 are moved to the left. First hydraulic spool valve 42 thus connects pressure line 61 to line 57, causing hydraulic fluid to flow into third chamber 53. At the same time, line 58 is connected to return line 62 allowing hydraulic fluid to flow out of fourth chamber 54. Simultaneously, second hydraulic spool valve 46 connects pressure line 59 to line 55, causing hydraulic fluid to flow into first chamber 51. At the same time, line 56 is connected to return line 60 allowing hydraulic fluid to flow out of second chamber 51. Piston 49 is therefore caused to move to the right.

It can be appreciated from FIG. 4 that any backlash in either of the valves will cause one hydraulic spool valves 42, 46 to connect its pressure line to the cylinder before the other valve has moved. This can cause a buildup of pressure in one of the four fluid chambers 51-54 while the piston 49 is unable to move within cylinder 50. This pressure build up may for example cause damage to the seals or to the fluid transfer lines. By contrast, when the backlash accounting designs of FIGS. 2a and 3a are employed for both the hydraulic spool valves 42, 46, there will be no backlash and the two valves will operate in synchrony with no force fight. Furthermore, the simple mechanical nature of the present disclosure does not require the additional hydraulic circuitry of the system disclosed in EP 3 128 216.

The invention claimed is:

1. A hydraulic spool valve assembly, comprising:
a hydraulic spool valve comprising a first slot; and
a drive lever for actuating a hydraulic spool valve, the drive lever extending along a longitudinal axis (L) to a first end positioned within the first slot of a hydraulic spool valve,
wherein the first end comprises at least two resilient members spaced radially apart a distance slightly larger than the width of the first slot when disconnected from the hydraulic spool valve, such that the at least two resilient members are compressed radially inward when engaged with the one or more inner surfaces of the first slot to exert a radially outward force ($F_1$, $F_2$) on one or more inner surfaces of the first slot of the hydraulic spool valve; and
wherein a portion of one or more of the inner surfaces of the first slot is chamfered.

2. The hydraulic spool valve assembly of claim 1, wherein the at least two resilient members are integrally formed and are separated by a second slot.

3. The hydraulic spool valve assembly of claim 2, wherein the second slot is a key-hole slot.

4. The hydraulic spool valve assembly of claim 1, wherein the at least two resilient members are separately formed and arranged to form a cantilever.

5. The hydraulic spool valve assembly of claim 4, wherein the cantilever is formed by a fastener being secured through the at least two resilient members and an intervening portion of the drive lever.

6. The hydraulic spool valve assembly of claim 5, wherein the fastener is a rivet.

7. The hydraulic spool valve assembly of claim 1, wherein the first end comprises a case hardened surface.

8. The of claim 1, wherein the at least two resilient members have a cambered outer surface.

9. The hydraulic spool valve assembly of claim 1, wherein the drive lever is operatively connected to the hydraulic spool valve such that movement of the drive lever causes the hydraulic spool valve to move axially.

10. The hydraulic spool valve assembly of claim 1, comprising two or more hydraulic spool valves operatively connected to a respective drive lever and each respective drive lever is operatively connected to a common input lever, such that movement of the common input lever causes actuation of each respective drive lever and causes the two or more hydraulic spool valves to move axially.

11. A hydraulic actuator comprising:
the hydraulic spool valve assembly of claim 9;
a hydraulic cylinder; and
a piston, wherein the piston is housed within the hydraulic cylinder, wherein the one or more hydraulic spool valves are in fluid communication with the hydraulic cylinder and piston such that axial movement of the one or more hydraulic spool valves causes fluid to enter and/or exit the hydraulic cylinder causing piston to move axially.

12. A method of connecting a drive lever to a hydraulic spool valve, the method comprising:
inserting at least two resilient members of a drive lever into a first slot in the hydraulic spool valve, wherein the at least two resilient members are spaced radially apart a distance slightly larger than the width of the first slot when disconnected from the hydraulic spool valve, such that the inserting causes radial compression ($R_1$, $R_2$) of the at least two resilient members, such that the at least two resilient members engage and exert a radially outward force ($F_1$, $F_2$) on the one or more inner surfaces of the first slot;
wherein a portion of one or more of the inner surfaces of the first slot is chamfered.

* * * * *